March 22, 1966 L. F. FRANK 3,241,438
CYLINDRICAL LENS SCANNING SYSTEM
Filed June 18, 1963
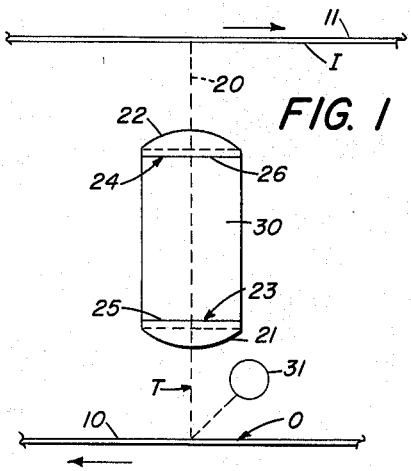
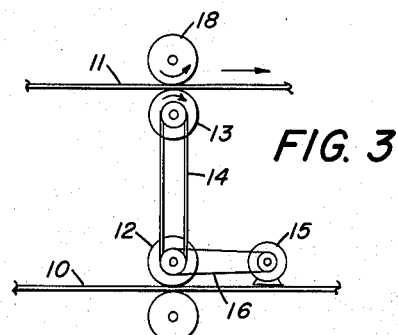
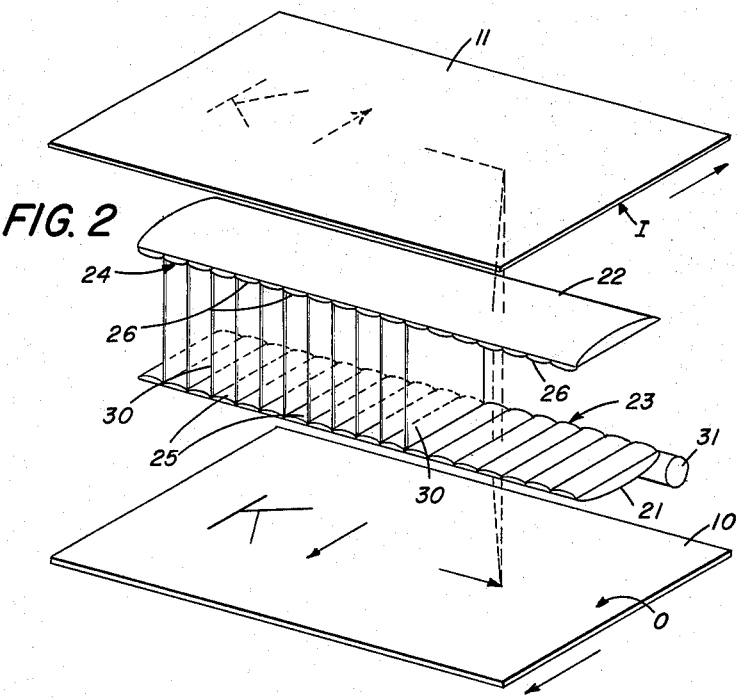
LEE F. FRANK
INVENTOR.
BY
ATTORNEY & AGENT

United States Patent Office 3,241,438
Patented Mar. 22, 1966

3,241,438
CYLINDRICAL LENS SCANNING SYSTEM
Lee F. Frank, Cambridge, Mass., assignor to Eastman Kodak Company, Rochester, N.Y., a corporation of New Jersey
Filed June 18, 1963, Ser. No. 288,661
10 Claims. (Cl. 88—24)

The present invention relates to an optical scanning system, and more particularly to an optical system for transmitting line-by-line images of an original to a light-sensitive copy material on which a right reading light image of the original is formed.

In a conventional contact printing system, an original is placed in contact with a photosensitive copy material and subjected to intense illumination for exposing an image of the original on the photosensitive surface by transmission of the light through the original, a right reading image being obtained only when the image on one surface of the original is transmitted through the original to the photosensitive material. Whether the original image is contiguous to the photosensitive surface or is transmitted through the original, the material bearing the original image cannot be impervious to light but must be capable of transmitting light so as to permit making of a copy.

It is also known in systems utilizing a flow type of reproduction to move the original in one direction and the copy material, which in this case can be a light sensitive film, in the opposite direction, the original being moved past an aperture of narrow width and the portion of the original in such aperture being projected onto the film in a reduced size. In such apparatus, the original and light-sensitive material are not only moved in opposite directions, but must be moved at synchronous rates in order to obtain a continuous reproduction of the original. This type of system possesses a disadvantage in that the copy of the original is usually of reduced size so that an exact copy can be made only by an enlargement of the flow copy.

While the systems mentioned hereinabove have advantages as well as disadvantages, depending on the type of copy and the purpose for which such copy is to be used, the flow systems have the common disadvantage that complex mechanisms and optical systems are required to provide a feasible apparatus. In the invention described hereinafter, a relatively simple optical system provides for a right reading image of the original, and the original can be transparent or opaque and need not be confined to any particular length, as is usually the case in contact printing, but possesses both the advantages of the flow type system and the continuous contact system. This is accomplished in the present invention by utilizing a lens system embodying the optical principles of cylindrical lenses by which a copy of unit magnification of the original can be obtained.

The primary object of the invention, therefore, is to provide an optical system by which a right reading, light image of an original can be obtained by the use of simple cylindrical lenses.

Another object of the invention is to provide an optical scanner system in which an original and a light-sensitive material are moved in opposite directions with respect to an optical system comprising cylindrical lenses so as to obtain a right reading, light image copy of unit magnification.

Still another object of the invention is to provide an optical system which is relatively simple and inexpensive to manufacture as well as feaible for copying originals which can be transparent or opaque and of any length.

These and other objects and advantages will be apparent to those skilled in the art by the description which follows.

Reference is now made to the accompanying drawing wherein like reference numerals and letters designate like parts and wherein:

FIG. 1 is a schematic view showing the relation of the object and image planes and the optical system arranged therebetween;

FIG. 2 is a perspective view similar to FIG. 1 showing more clearly the optical system and the baffle arrangement interposed between the elements of the optical system; and FIG. 3 is a diagrammatic view of a drive mechanism for moving the original and copy material in opposite directions.

With reference to FIG. 1, an original 10 is moved in a horizontal plane which may be referred to as an object plane O. Spaced from plane O and parallel thereto, a copy material 11, which can be a photosensitive paper or film, is moved through an image plane I and in a direction opposite to that of the original 10. As shown in FIG. 3, the original 10 and copy 11 are moved in opposite directions by means of rollers 12 and 13 which are interconnected by a belt or chain 14. The drive means for rollers 12 and 13 is derived from a motor 15 which, in turn, is connected by a belt or chain 16 to roller 12. Suitable rollers 17 and 18, respectively, engage rollers 12 and 13 to provide a means for frictionally driving the original and copy in synchronism through the object and image planes, respectively. The rollers 12, 13, 17 and 18 are preferably rubber rollers so as to provide a more positive engagement with the original and copy material. Such rollers extend transversely of the paths of movement of the original and copy material and can be single rollers or a plurality of spaced rollers located at any position along said paths of movement, but preferably close to the optical system to be described hereinafter.

A line 20, as shown in FIG. 1, is perpendicular to the object plane O and the image plane I and a plane perpendicular to planes O and I in which line 20 lies can be defined as a transmission plane T for the light images. A first primary cylindrical lens 21 and a second primary cylindrical lens 22 are arranged between the object and image planes with their cylindrical axes lying in one azimuth or the transmission plane T. The cylindrical lenses 21 and 22 are of the same power so as to provide a symmetrical system whereby the focal line of one lens is coincident with that of the other lens in a plane centrally located between the object and image planes. Since the lenses 21 and 22 provide a symmetrical lens system, the distance between the lens 21 and its object plane which is coincident with the object plane O must be the same as the distance between the lens 22 and its object plane which is coincident with image plane I, in order to define a real image in the image plane I.

In order to provide a unit magnification system with the use of a pair of cylindrical lenses, such as lenses 21 and 22, it is necessary that an erecting system 23 and 24 be incorporated with each of said lenses. This can be accomplished by providing two sets or groups of secondary cylindrical lenses 25 and 26 whose cylindrical axes are parallel and extend in another azimuth which is perpendicular to the transmission plane T, the lenses 25 and 26 being arranged contiguously and transversely of the path of movement of the original 10, as shown in FIG. 2. Such an erecting system can be a plurality of lenses contiguous to its respective primary cylindrical lens 21 or 22, or it can be integral with its respective cylindrical lens 21 or 22 by forming such plurality of cylindrical lenses 25 and 26, respectively, on the plano surface of the cylindrical lenses 21 and 22. With such an optical system, the central focal plane images will be smaller than the original and will provide a smooth overlap of focal fields in the image plane I. It is essential, however, that the secondary cylindrical lenses 25, which are formed on lens 21, be optically aligned with the corresponding secondary cylindrical lenses 26 formed on the lens 22. In order to prevent overlap of the focal fields, a series of baffles 30 are arranged between each of the secondary cylindrical lenses 25 and 26, said baffles extending between the cylindrical lenses 21 and 22, so as to form a plurality of pairs of cylindrical lenses, each of which comprises one of lenses 25 and one of lenses 26, as shown in FIG. 2. Although the baffles 30 reduce the light efficiency, a very high intensity light source 31 can be used with this optical system and offsets the relatively low light efficiency due to the baffle arrangement. As shown in FIG. 1, the light source 31 can be arranged in close relation to the intersection of the transmission plane T and object plane O for illuminating the original 10.

As the original 10 and the light-sensitive copy material 11 are moved toward the transmission plane T from opposite directions, a line extending across the original forms the object in the object plane of the cylindrical lens 21 which, with the plurality of lenses 25, brings this line to a focus as an aerial image in a central focal plane midway between lenses 21 and 22. Each portion of the line that is imaged in the central focal plane by a lens element 25 is reversed right to left. Each lens element 26 reverses its corresponding portion of the aerial image so that lens 22 forms a right reading image of unit magnification of a line of the original in the image plane I. As each such successive line or increment of the original is moved past the transmission plane, the image thereof is transmitted to the copy material and by such successive linear images, a line-by-line reproduction of the original is formed on the copy or light-sensitive material 11. Since the optical system is symmetrical, the image is right reading when the copy is observed from the underside of the image plane I, which would be equivalent to holding the copy for normal reading.

It will be apparent to those skilled in the art that the lenses 21 and 22 can be readily formed from a clear plastic material, as well as glass, and that the erecting systems 23 and 24 can be either molded with its respective lens 21 or 22 if the material is plastic, or ground in the plano surfaces thereof, if the material is glass. The baffles 30 can be of any thin, opaque material so as to optically insulate the image formed in the central focal plane by each pair of cylindrical lenses comprising lenses 25 and 26. It will also be obvious that the secondary cylindrical lenses can also be arranged between the primary cylindrical lenses and their respective planes, and that other optical systems or a modification of the optical system described herein can be made by those skilled in the art. However, the invention is not to be limited to the embodiment disclosed and described herein, but is of a scope as defined by the appended claims.

The embodiments of the invention in which an exclusive property or privilege is claimed are defined as follows:

1. An optical system for producing on an image plane a right reading image of an original in an object plane parallel to and spaced from said image plane, comprising:
   two primary cylindrical lenses optically aligned between said image and object planes with their cylindrical axes parallel and in one azimuth, said lenses being spaced apart and each being spaced from its respective adjacent plane by a distance substantially equal to its focal length;
   two sets of secondary cylindrical lenses optically aligned in pairs between said image and object planes with their cylindrical axes parallel to each other and in an azimuth perpendicular to said one azimuth, each pair of secondary cylindrical lenses forming an aerial image of a portion of the object plane between them and relaying said image to said image plane; and
   baffle means arranged between said sets of secondary cylindrical lenses for optically insulating the light of each pair of secondary cylindrical lenses from the light of the adjacent pair of secondary cylindrical lenses.

2. An optical system in accordance with claim 1 wherein said two primary cylindrical lenses are equally and symmetrically spaced between said image and object planes.

3. An optical system in accordance with claim 1 wherein each set of said secondary cylindrical lenses comprises a plurality of contiguous, narrow lenses in contact with one of said primary cylindrical lenses.

4. A optical system in accordance with claim 1 wherein said two primary cylindrical lenses are equally and symmetrically spaced between said image and object planes and each set of said secondary cylindrical lenses is equivalent to the other and is in contact with one of said primary cylindrical lenses so as to form said aerial images in a focal plane centrally of said primary cylindrical lenses.

5. A countercurrent scanning system for producing a right reading light image copy of an original, the combination comprising:
   means for defining an object plane and an image plane spaced from and parallel to said object plane;
   means for synchronously moving said original in a path through said object plane in one direction and a light-sensitive copy material in a path through said image plane in the opposite direction;
   means arranged adjacent said object plane for illuminating said original;
   two primary cylindrical lenses optically aligned between said object and image planes with their cylindrical axes parallel and in one azimuth, said lenses being spaced apart and each being spaced from its respective adjacent plane and a common focal plane by a distance substantially equal to its focal length for successively transmitting line-by-line images of said original to said copy material;
   an erecting lens system including two sets of secondary cylindrical lenses optically aligned in pairs between said object and image planes with their cylindrical axes parallel to each other and in an azimuth perpendicular to said one azimuth, each pair of said secondary cylindrical lenses forming an aerial image of unit magnification of line-by-line portions of said original and relaying said image to said copy material; and
   baffle means arranged between said sets of secondary cylindrical lenses for optically insulating the light of each pair of secondary cylindrical lenses from the light of the adjacent pair of cylindrical lenses.

6. A countercurrent scanning system in accordance with claim 5 wherein said primary cylindrical lenses are equally and symmetrically spaced between said object and image planes and have a common focal line lying in said common focal plane centrally of said planes.

7. A countercurrent scanning system in accordance with claim 6 wherein each set of said secondary cylindrical lenses comprises a plurality of contiguous, narrow cylindrical lenses in contact with one of said primary cylindrical lenses, the optical axes of said cylindrical lenses in one set being optically aligned with the axes of corresponding cylindrical lenses in the other set.

8. A countercurrent scanning system in accordance with claim 7 wherein said baffle means comprises thin, opaque members extending between pairs of said cylindrical lenses in each of said sets.

9. A countercurrent scanning system for producing a right reading light image copy of an original, the combination comprising:
- a light tranmission plane;
- an object plane normal to said transmission plane;
- an image plane normal to said transmission plane and spaced from said object plane;
- means for synchronously moving said original in a path through said object plane in one direction and a light-sensitive copy material in a path through said image plane in the opposite direction;
- means arranged adjacent said object plane and said transmission plane for illuminating said original;
- a symmetrical lens system comprising two spaced, primary cylindrical lenses optically aligned between said object and image planes with their cylindrical axes parallel and in one azimuth and having a common focal line lying in said transmission plane for successively transmitting line-by-line images of said original to said copy;
- an erecting system arranged between and with respect to each of said primary cylindrical lenses comprising a plurality of contiguous, narrow, secondary cylindrical lenses with their cylindrical axes parallel to each other and in an azimuth perpendicular to said one azimuth, each of said secondary cylindrical lenses in one system being optically aligned with those in the other system and forming an aerial image of unit magnification of line-by-line portions of said original in a plane containing said common focal line; and
- means arranged between corresponding secondary cylindrical lenses of each of said erecting systems for optically insulating the light of each pair of cylindrical lenses from the light of the adjacent pair of cylindrical lenses.

10. A countercurrent scanning system in accordance with claim 9 wherein each of said erecting systems comprises a plurality of contiguous, narrow secondary cylindrical lenses formed integral with its respective primary cylindrical lens, the cylindrical axes of said secondary cylindrical lenses being perpendicular to the cylindrical axis of its primary cylindrical lens and extending in the direction of the paths of movement of said original and said copy material.

No references cited.

NORTON ANSHER, *Primary Examiner.*